US012483618B2

(12) United States Patent
Sawal et al.

(10) Patent No.: US 12,483,618 B2
(45) Date of Patent: Nov. 25, 2025

(54) REROUTING OF CLIENT SERVER CONNECTIONS

(71) Applicant: Dell Products L.P., Round Rock, TX (US)

(72) Inventors: Vinay Sawal, Fremont, CA (US); Alan White, Glasgow (GB); Mauro Monteiro Silva, Cork (IE)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 18/621,495

(22) Filed: Mar. 29, 2024

(65) Prior Publication Data

US 2025/0310399 A1 Oct. 2, 2025

(51) Int. Cl.
| G06F 15/16 | (2006.01) |
| H04L 67/1008 | (2022.01) |
| H04L 67/1012 | (2022.01) |
| H04L 67/566 | (2022.01) |

(52) U.S. Cl.
CPC ...... H04L 67/1012 (2013.01); H04L 67/1008 (2013.01); H04L 67/566 (2022.05)

(58) Field of Classification Search
CPC ............... H04L 67/1012; H04L 67/566; H04L 67/1008
USPC ........................................................ 709/203
See application file for complete search history.

(56) References Cited

U.S. PATENT DOCUMENTS

| 8,031,726 | B2 * | 10/2011 | Ansari ................ H04L 63/0876 709/224 |
| 8,752,017 | B2 | 6/2014 | Hossain et al. |
| 8,976,644 | B2 * | 3/2015 | Arumugam ............. H04L 45/16 370/400 |
| 9,036,634 | B2 * | 5/2015 | Arumugam ............. H04L 45/16 370/390 |
| 9,064,049 | B2 | 6/2015 | Zinkovsky et al. |
| 9,251,040 | B2 | 2/2016 | Cai et al. |
| 9,734,169 | B2 | 8/2017 | Redlich et al. |
| 10,088,890 | B1 * | 10/2018 | Ehrhardt ............... H04L 67/141 |
| 10,187,249 | B2 * | 1/2019 | Borah ................. H04L 41/5009 |
| 10,191,800 | B2 * | 1/2019 | Borah ................... G06F 11/079 |
| 11,308,035 | B2 | 4/2022 | Prahlad et al. |
| 11,477,246 | B2 | 10/2022 | Raleigh et al. |
| 12,284,197 | B1 * | 4/2025 | Martin .................. H04L 67/306 |
| 2002/0044549 | A1 * | 4/2002 | Johansson ............. H04W 40/32 370/386 |
| 2003/0046426 | A1 * | 3/2003 | Nguyen ................ H04L 41/083 709/224 |

(Continued)

*Primary Examiner* — Alicia Baturay
(74) *Attorney, Agent, or Firm* — WOMBLE BOND DICKINSON (US) LLP (57) ABSTRACT

Methods and systems for gracefully rerouting connections between client devices and server devices are disclosed. The method may include suspending a logical connection between a client device and a service provided by a server device set and placing the logical connection in a predetermined state. While the logical connection is in the predetermined state, modifying a transmission path supporting the logical connection to remove a first aggregator that was previously in the transmission path and add a second aggregator to a second server device set to the transmission path. Using the modified transmission path, the logical connection may be resumed to enable the client device to resume use of the service provided by the second server device set.

20 Claims, 6 Drawing Sheets

(56) References Cited

U.S. PATENT DOCUMENTS

| | | |
|---|---|---|
| 2010/0165881 A1* | 7/2010 | Hof ...................... H04L 47/125 |
| | | 370/254 |
| 2019/0258631 A1 | 8/2019 | Pal et al. |
| 2020/0183936 A1 | 6/2020 | Ramesh et al. |
| 2020/0192850 A1 | 6/2020 | Caruk et al. |
| 2025/0028856 A1* | 1/2025 | Huntley ................ G06F 21/602 |

* cited by examiner

REROUTING OF CLIENT SERVER CONNECTIONS

FIELD

Embodiments disclosed herein relate generally to rerouting connections between client and server devices. More particularly, embodiments disclosed herein relate to rerouting connections by modifying a transmission path between a client and a server device while a logical connection between the client and the server device is suspended.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for rerouting a connection between a client device and a server device. To provide computer implemented services, the client device and the server device may communicate over a transmission path. The transmission path may support a logical connection between the client device and the server device. Because the client device and the server device may be hosted in different network domains, an aggregator may be used to facilitate the communication across network domains.

To facilitate the communication, the aggregator may provide data routing services for the connections between any number of client devices and any number of server devices. The statuses of at least a portion of the connections that run through the aggregator may be monitored by a load balancing system. Over time, the aggregator may become overloaded. When the aggregator is overloaded, computer implemented services provided by connections through the aggregator may be negatively impacted. For example, a delay in the data routing services provided by the aggregator may occur when more connections run through the aggregator than the aggregator may support. When the aggregator is identified as being overloaded, a client device of the client devices may be selected to reroute the connection between the client device and a server device set that communicates with the client device.

However, disruptions to the computer implemented services may occur when the connection between the client device and the server device set is rerouted. For example, end-to-end encryption agreements may be terminated, data may be lost, responses may be delayed, and/or any other undesired behaviors may occur.

To improve the likelihood that a connection between a client device and a server device set may be rerouted gracefully, a transmission path between the client device and the server device set may be modified while a logical connection between the client device and a service provided by the server device set is suspended. The transmission path may be modified by removing the first aggregator from the transmission path and adding a second aggregator to a second server device set to the transmission path. When the transmission path is modified, the logical connection may resume to enable the client device to resume use of the service provided by the server device set.

Thus, embodiments disclosed herein may provide an improved method for gracefully rerouting connections between client and server devices by modifying a transmission path between a client and a server device while a logical connection between the client and server device is suspended.

In an embodiment, a method for rerouting connections between client and server devices is provided. The method may include (i) identifying, by a load balancing system, that a transmission path between a client device and a server device set is to be modified, the transmission path supporting a logical connection between a first entity hosted by the client device and a service provided by at least the server device set; (ii) based on the identifying: (a) initiating suspension of the logical connection until the logical connection is free of in-transit data; (b) while the logical connection is free of the in-transit data, modifying the transmission path to remove a first aggregator that was previously in the transmission path, and add a second aggregator to a second server device set and that was not previously in the transmission path; and (c) resuming, using the modified transmission path, the logical connection to enable the client device to resume use of the service.

The client device and the server device set may be hosted in different network domains, and aggregators may facilitate communication between the different network domains by providing data routing services, and the aggregators may include the first aggregator and the second aggregator.

Identifying that a transmission path is to be modified may include obtaining information regarding statuses of at least a portion of the connections that run through the first aggregator, the information usable to identify whether the first aggregator is overloaded.

The transmission path may be a physical route that data follows to support communication between the client device and the server device set.

The server device set may be one of a plurality of server device sets, each of the plurality of server device sets being configured to provide the service to the client device while the client device is in communication with a corresponding one of the device sets.

Initiating suspension of the logical connection may include: (i) sending a communication to the client device, the communication signaling the client device to: (a) synchronize a state of the logical connection between the client device and the first server device set; (b) flush the logical connection to complete transmission of all in-transit data over the transmission path; and (c) suspend transmission of new data over the transmission path.

Modifying the transmission path may include: (i) disconnecting an internet protocol routable connection between the client device and the first aggregator in the transmission path; (ii) selecting a second aggregator based at least in part on a load balancing algorithm; and (iii) establishing a new internet protocol routable connection between the client device and the second aggregator in the transmission path.

Resuming the logical connection may include: (i) sending, by the second aggregator, a communication to the client device, the communication signaling that the logical connection is to be resumed; and (ii) initiating performance of data transmission between the client device and the second server device set along the modified transmission path.

Performance of data transmission between the client device and the second server device set along the modified transmission path may be based on the synchronized state of the logical connection between the client device and the first server device set.

Disconnecting the internet protocol routable connection from the first aggregator and establishing the new internet protocol routable connection with the second aggregator may be non-disruptive to the connection between the client device and any of the plurality of server device sets.

The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Figure 1:
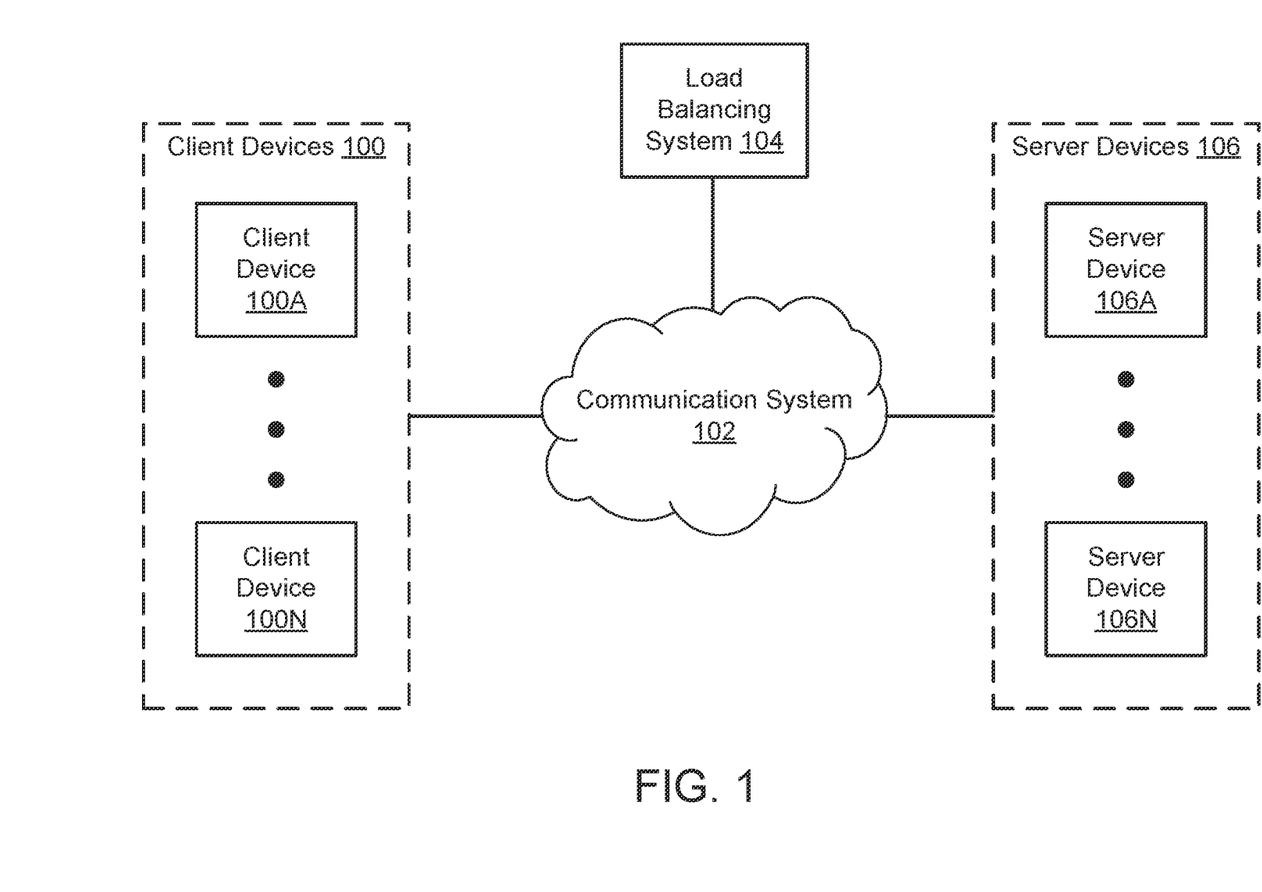
FIG. 1 shows a diagram illustrating a system in accordance with an embodiment.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include client devices 100, load balancing system 104, and server devices 106. The computer implemented services may be provided by one or more components of the system of FIG. 1.

A client device (e.g., 100A) of client devices 100 may provide at least a portion of the computer implemented services using data obtained from server devices 106. Client devices 100 may include any number of client devices that may each utilize data from server devices 106. Server devices 106 may include any number of server devices that may each be configured to provide the data to a client device of client devices 100. To provide the services, a connection may be established between the client device (e.g., 100A) and a server device (e.g., 106A).

Because the client device and the server device may be hosted in different network domains and the different network domains may be separated by a distance (e.g., not on a same local physical network), an aggregator may be used to facilitate communication between the different network domains by providing data routing services for connections that run through the aggregator. The statuses of at least a portion of the connections that run through the aggregator may be monitored by load balancing system 104.

Over time, the aggregator may become overloaded. For example, more connections may run through the aggregator than the aggregator may be able to handle timely, workloads supported by the connections that run through the aggregator may increase, and/or any other conditions may overload the aggregator. To identify that the aggregator is overloaded, load balancing system 104 may obtain information regarding statuses (e.g., number of connections, rate of data transfer, etc.) of at least a portion of the connections that run through the aggregator. When the aggregator is identified to be overloaded, load balancing system 104 may select a client device (e.g., 100A) to reroute the connection through a second aggregator to a second server device (e.g., 106B). The second aggregator and second server device (e.g., 106B) may be selected by load balancing system 104 based at least in part on a load balancing algorithm (e.g., least loaded).

Services provided by the first server device (e.g., 106A) to remaining client devices (e.g., 100B-100N) may be improved by rerouting the selected client device (e.g., 100A) and reducing the workload supported by the first aggregator to the first server device (e.g., 106A). Further, services provided to the client device (e.g., 100A) may also be improved by rerouting the connection between the client device (e.g., 100A) through the second aggregator to the second server device (e.g., 106B) and reducing the likelihood of resource constraints imposed on the second aggregator and second server device (e.g., 106B) by the client device (e.g., 100A).

However, disruptions to the computer implemented services may occur when the connection between the client device (e.g., 100A) and a server device of server devices 106 is rerouted. For example, end-to-end encryption agreements may be terminated, data may be lost, responses may be delayed, and/or any other undesired behaviors may occur.

In general, embodiments disclosed here relate to systems and methods for gracefully rerouting connections between client and server devices. To reroute a connection between a client device and a server device, a transmission path between the client device and the server device may be modified while a logical connection (e.g., method of data transmission) between the client device and a service provided by the server device is suspended and in a predetermined state to reduce the likelihood of data loss and/or other undesired impacts. The transmission path may be a physical route that data follows to support communications via the logical connection between the client device and the server device.

To suspend the logical connection and place the logical connection in a predetermined state, loading balancing system 104 may send a communication to the client device (e.g., 100A) to (i) synchronize a state of the logical connection, (ii) flush the logical connection to complete transmission of all in-transit data over the transmission path, and (iii) suspend transmission of new data over the transmission path. While the logical connection is suspended and in the predetermined state, the transmission path between the client device (e.g., 100A) and a server device of server devices 106 may be modified.

To modify the transmission path, the first aggregator to the first server device (e.g., 106A) may be removed from the transmission path, and a second aggregator to a second server device (e.g., 106B) may be added to the transmission path. To remove the first aggregator from the transmission path, an internet protocol routable connection between the client device (e.g., 100A) and the first aggregator may be disconnected. The disconnection of the internet protocol routable connection may be non-disruptive to the connection between the client device and a service provided by at least the server device (e.g., 106A). To add the second aggregator to the transmission path, a new internet protocol routable connection may be established between the client device (e.g., 100A) and the second aggregator.

When the new internet protocol routable connection is established, the logical connection may be resumed to enable the client device (e.g., 100A) to resume use of the service using the modified transmission path to the second server device (e.g., 106B). The logical connection may be resumed from the point of suspension so that new data transmission may resume based on the synchronized state of the logical connection. For example, data transmission gaps/loss, duplicate data, and/or any other undesired behaviors may not occur while the transmission path is modified.

By utilizing the rerouting approach discussed above, client and server devices may be more likely to provide computer implemented services without interruption when a connection between a client device and a server device is rerouted gracefully.

To provide the above noted functionality, the system may include client devices 100, load balancing system 104, and server devices 106. Each of these components is discussed below.

Client devices 100 may, as discussed above, provide various computer implemented services to users thereof and/or other devices operably connected to client devices. To provide the computer implemented services, client devices 100 may utilize services provided by server devices 106. To do so, client devices 100 may communicate and send requests for various requested data or workloads to be performed.

Load balancing system 104 may, as discussed above, provide communication routing services and load balancing services. To provide the communication routing services, load balancing system 104 may establish a transmission path of any distance between different network domains. To establish the transmission path, load balancing system may employ logical network constructs (e.g., tunnels, routing protocols, etc.) to forward data between intermediate nodes (e.g., aggregators, client interface sets). For example, internet protocol routable addresses may be exposed to enable data forwarding between entities in different network domains. Because client device 200 and server devices 106 may be hosted in different network domains and the different network domains may be separated by a distance (e.g., not on a same local physical network), load balancing system 104 may identify a transmission path utilizing an aggregator and a client interface set through which client device 200 and server devices 106 may communicate.

Figure 2A:
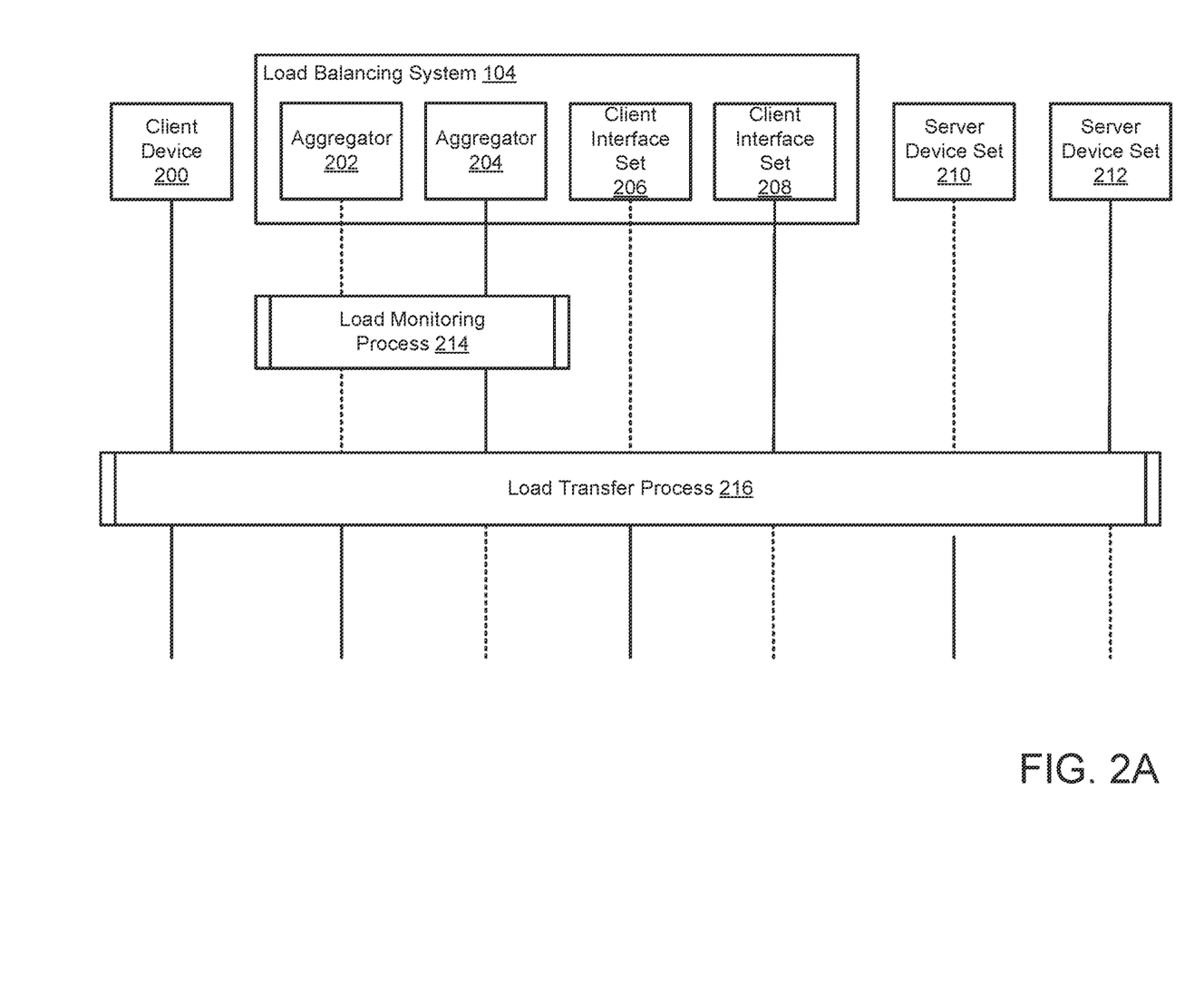
FIGS. 2A-2B show interactions diagrams in accordance with an embodiment.
Figure 2B:
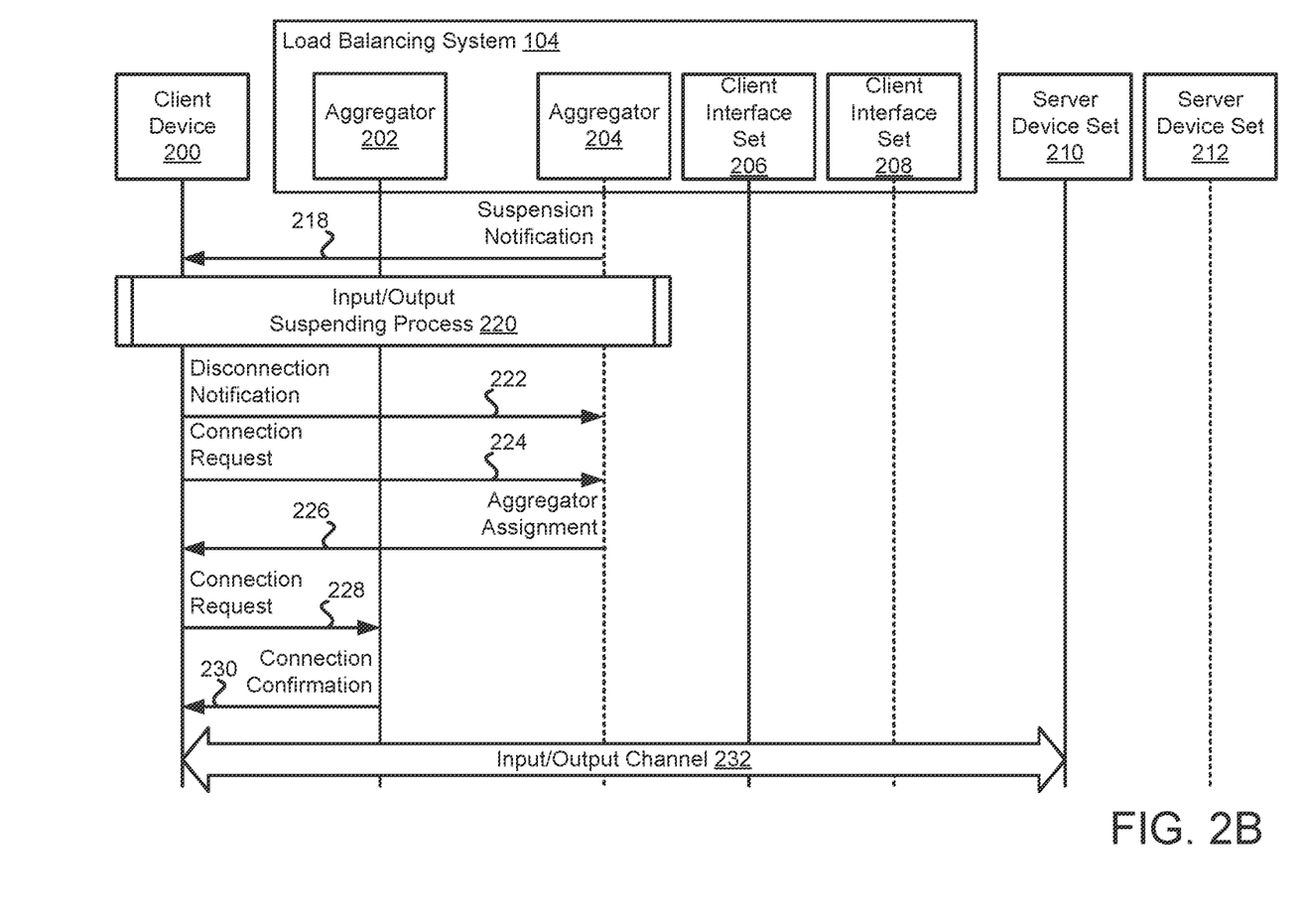

To provide the load balancing services, load balancing system 104 may monitor the connections between client devices 100 and server devices 106, and assign modified transmission paths for connections that may be rerouted. To monitor the statuses of the connections, load balancing system 104 may obtain information regarding the statuses of the connections (e.g., number of connections, rate of data transfer, etc.) to identify if an aggregator of the aggregators may be overloaded. To assign a modified transmission path, load balancing system 104 may send a communication to a client device of client devices 100 signaling the client device to reroute a connection to server devices 106. Refer to FIGS. 2A-2B for additional details regarding load balancing services and communication routing services provided by load balancing system 104.

Server devices 106 may, as discussed above, provide request handling services for requests obtained from client devices 100. To provide the request handling services, server devices 106 may perform workloads, communicate data, and/or provide any other services requested by client devices 100. To do so, server devices 106 may utilize client communication facilitating services provided by client interface sets.

Communication system 102 may allow any of client devices 100, load balancing system 104, and server devices 106 to communicate with one another (and/or with other devices not illustrated in FIG. 1). To provide its functionality, communication system 102 may be implemented with one or more wired and/or wireless networks. Any of these networks may be a private network (e.g., the "Network" shown in FIG. 4), a public network, a virtual network (e.g., virtual private network), and/or may include the Internet. For example, client devices 100 may be operably connected to server devices 106 via the Internet, a private network, etc. Client devices 100, load balancing system 104, server devices 106 and/or communication system 102 may be adapted to perform one or more protocols for communicating via communication system 102.

Any of (and/or components thereof) client devices 100, load balancing system 104, and server devices 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1, a system in accordance with an embodiment may gracefully reroute connections between client and server devices by modifying a transmission path between a client and a server device while a logical connection between the client and server device is suspended.

To further clarify embodiments disclosed herein, interactions diagrams in accordance with an embodiment are shown in FIGS. 2A-2B. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 200, 202, etc.), located towards the top of each figure.

Lines descend from these shapes. Processes performed by the components of the system are illustrated using a second set of shapes (e.g., 214, 216, etc.) superimposed over these lines. Interactions (e.g., communication, data transmissions, etc.) between the components of the system are illustrated using a third set of shapes (e.g., 220, 222, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

The lines descending from some of the first set of shapes (e.g., 204, 208, etc.) is drawn in dashing to indicate, for example, that the corresponding components may not be (i) operable, (ii) powered on, (iii) present in the system, and/or (iv) not participating in operation of the system for other reasons.

Generally, the processes and interactions are temporally ordered in an example order, with time increasing from the top to the bottom of each page. For example, the interaction labeled as 220 may occur prior to the interaction labeled as 222. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes that may occur during graceful rerouting of a connection between a client device and a server device set.

Client device 200 may be a client device (e.g., 100A) that is to reroute a connection to a server device set. Client device 200 may initially be connected to server device set 212 via a transmission path that includes aggregator 204 and client interface set 208. Server device set 212 may include one or more of server devices 100 that all host separate instances of an application that provides a same service. When connected to server device set 212, client device 200 may obtain the service from one of the server devices in server device set 212. Because client device 200 and server device set 212 may be hosted in different network domains, routing services may be performed via tunnels and/or other network constructs. Aggregator 204 and client interface set 208 may perform at least a portion of the routing services to facilitate communication along the transmission path between client device 200 and server device set 212.

Server device set 210 may be a second server device set. A transmission path to server device set 210 may include aggregator 202 and client interface set 206. Aggregator 202, client interface set 206, and server device set 210 may provide a same service (e.g., similar to aggregator 204, client interface set 208, and server device set 212).

In FIG. 2A, the lines descending from aggregator 202, client interface set 206, and server device set 210 are drawn partially in dashing to indicate, for example, that aggregator 202, client interface set 206, and server device set 210 may not yet have been added to the transmission path. Correspondingly, the lines descending from aggregator 204, client interface set 208, and server device set 212 are drawn partially in dashing to indicate, for example, that aggregator 202, client interface set 206, and server device set 210 may be removed from the transmission path.

To gracefully reroute a connection, load balancing system 104 may perform load monitoring process 214. During load monitoring process 214, load balancing system 104 may monitor workloads performed over a portion of connections, identify that aggregator 204 may be overloaded, and assign client device 200 to modify the transmission path to reroute the portion of connections utilized by client device 200 to a second server device set. To monitor the workloads, load balancing system 104 may obtain information regarding statuses (e.g., number of connections, rate of data transfer, etc.) of at least a portion of connections that run through aggregator 204. To identify that aggregator 204 may be overloaded, load balancing system 104 may (i) analyze the information regarding statuses of the portion of connections that run through aggregator 204, (ii) perform calculations/comparisons to determine whether aggregator 204 may be able to perform workloads requested over the portion of connections timely, and/or utilize any other criteria to identify that aggregator 204 may be overloaded. To select client device 200, load balancing system may (i) obtain information regarding the workloads requested by client device 200, (ii) compare the workloads requested by client device 200 to workloads requested by other client devices that may be connected to aggregator 204, and/or any other methods. Once assigned, the transmission path between client device 200 and a server device set may be modified.

To modify the transmission path, load transfer process 216 may be performed. During load transfer process 216, a logical connection between client device 200 and server device set 212 may be suspended, the transmission path may be modified, and the logical connection may be resumed using a modified transmission between client device set 200 and server device set 210. Refer to FIG. 2B for additional information regarding load transfer process 216. The result of load transfer process 216 may be a modified transmission path between client device set 200 and server device set 210.

Thus, via processes and interactions shown in FIG. 2A, a logical connection between a client device and a first server device set may be gracefully rerouted to resume the logical connection between the client device and a second server device set.

Turning to FIG. 2B, a second interaction diagram in accordance with an embodiment is shown. FIG. 2B may illustrate processes and interactions that may occur during modifying of a transmission path between client device 200 and a server device set while a logical connection is suspended.

To modify a transmission path, at interaction 218, a suspension notification may be provided to client device 200 by load balancing system 104. For example, the suspension notification may be generated and provided to client device 200 via (i) transmission via a message, (ii) storing in a storage with subsequent retrieval by client device 200, (iii) via a publish-subscribe system where client device 200 subscribes to updates from load balancing system 104 thereby causing a copy of the suspension notification to be propagated to client device 200, and/or via other processes. By providing the suspension notification to client device 200, client device 200 may suspend a logical connection that runs through aggregator 204.

To suspend the logical connection that runs through aggregator 204, input/output suspending process 220 may be performed. To perform input/output suspending process 220, a state of the logical connection may be synchronized, the logical connection may be flushed, and new data transmission may be suspended. The state of the logical connection may be synchronized by (i) obtaining information regarding a predetermined state of the logical connection, (ii) verifying that the logical connection is at the predetermined state, (iii)

storing a copy of data while at the predetermined state, and/or any other methods. The logical connection may be flushed by (i) completing transmission of all in-transit data, (ii) clearing a queue of buffered data, and/or any other methods. New data transmission may be suspended by (i) pausing data transmission by client device 200, (ii) disabling a send function, and/or any other method.

At interaction 222, a disconnection notification may be provided to aggregator 204 by client device 200. For example, the disconnection notification may be generated and provided to aggregator 204 by (i) transmitting a message, (ii) initiating a disconnection method, and/or performing any other processes. By providing the disconnection notification to aggregator 204, an internet protocol routable connection between client device 204 and aggregator 204 may be disconnected and aggregator 204 may be removed from the transmission path.

At interaction 224, a connection request may be provided to load balancing system 104 by client device 200. For example, the connection request may be generated and provided to load balancing system 104 via (i) transmission via a message, (ii) via a publish-subscribe system where load balancing system 104 subscribes to updates from client device 200 thereby causing a copy of the connection request to be propagated to load balancing system 104, and/or via other processes. By providing the connection request to load balancing system 104, load balancing system 104 may provide load balancing services to provide a new aggregator assignment for client device 200.

At interaction 226, an aggregator assignment may be provided to client device 200 by load balancing system 104. For example, the aggregator assignment may be generated and provided to client device 200 by (i) selecting a second aggregator based on a load balancing algorithm (e.g., least loaded), (ii) transmitting a message signaling the selected aggregator, (iii) updating a configuration variable, and/or any other methods. The aggregator assignment may include, for example, a routable address (e.g., an internet protocol routable address, port number, etc.) usable to direct a connection request to aggregator 202. By providing the aggregator assignment to client device 200, client device 200 may add aggregator 202 to the transmission path.

At interaction 228, a connection request may be provided to aggregator 202 by client device 200. For example, the connection request may be generated and provided to aggregator 202 by (i) sending the request, (ii) creating a WebSocket object, (iii) invoking an API call, and/or any other method. By providing the connection request to aggregator 202, aggregator 202 may initiate the connection to provide data routing services for the connection between client devices 200 and server device set 210.

At interaction 230, a connection confirmation may be provided to client device 200 by aggregator 202. For example, the connection confirmation may include (i) acknowledgement of connection, (ii) signal of data transmissions to be resumed, and/or any other information. By providing the connection confirmation to client device 200, client device 200 may resume the logical connection to server device set 210 through aggregator 202.

In an embodiment, input/output channel 232 may be established between client device 200 and server device set 210. Because client device 200 and server device set 210 may be hosted in different network domains, input/output channel 232 may utilize communication routing services provided by aggregator 202 and client interface set 206. Utilizing input/output channel 232, client device 200 and server device set 210 may communicate by transmitting data along a transmission path. The communication between client device 200 and server device set 210 may provide desired computer implemented services. For example, client device 200 may send a data request to be serviced by server device set 210. Aggregator 202 may receive the request and transmit the request to client interface set 206. Client interface set 206 may interpret and provide the request to server device set 210. Server device set 210 may communicate a response to client device 200 using input/output channel 232. Once obtained, the response may provide a service to a user of client device 200.

Thus, via processes and interactions shown in FIG. 2B, a transmission path may be modified to resume a logical connection between a client device and a service provided by a second server device set.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
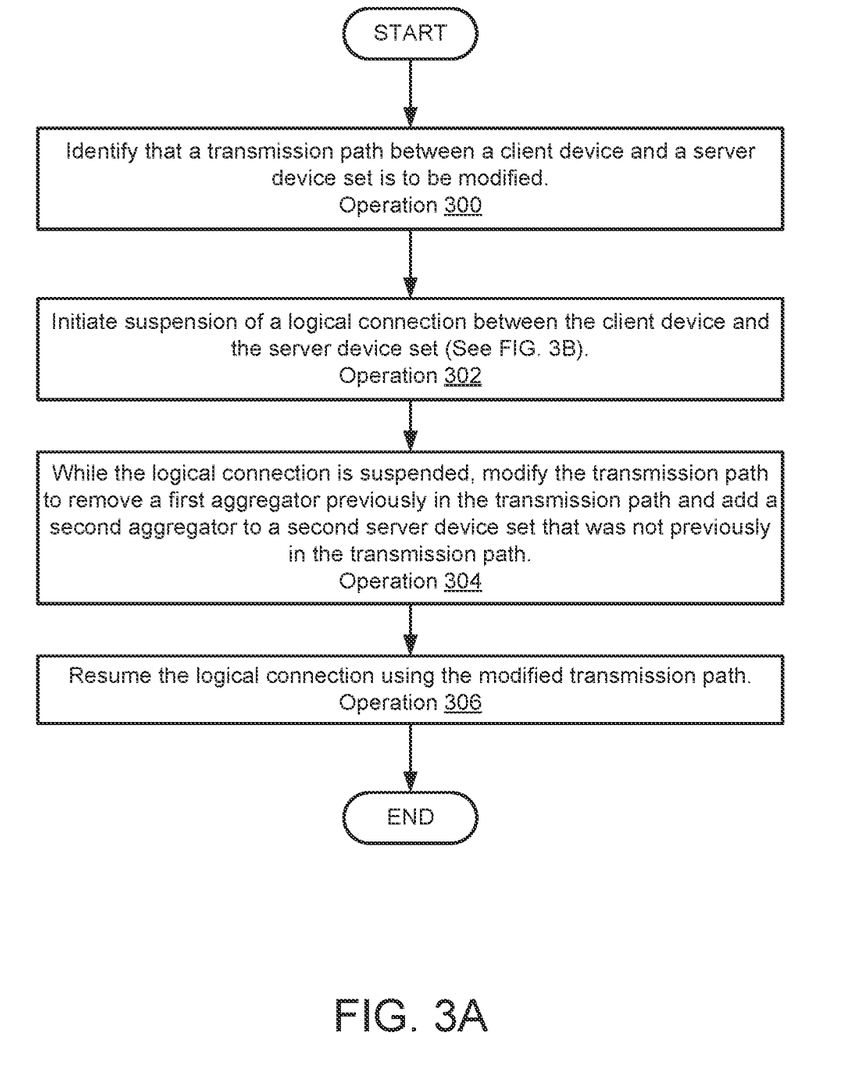
FIGS. 3A-3B show flow diagrams illustrating a method in accordance with an embodiment.
Figure 3B:
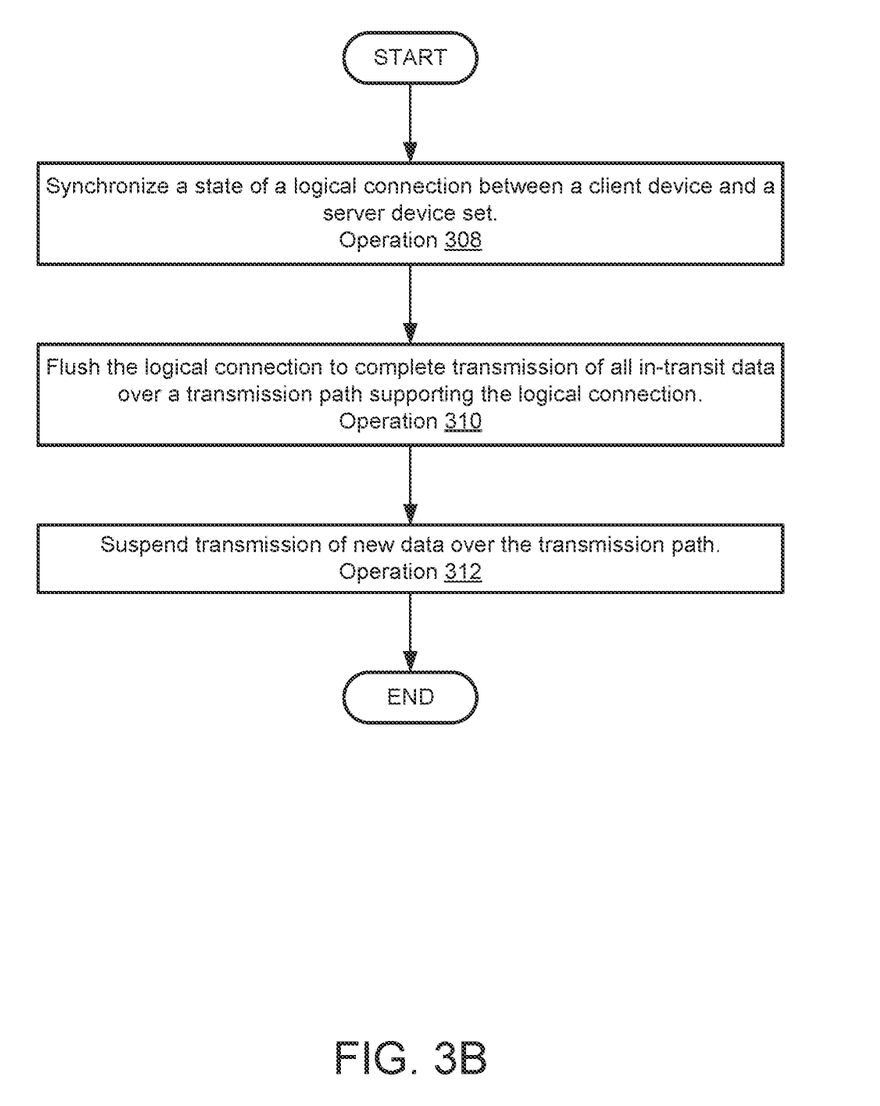

As discussed above, the components of FIG. 1 may perform various methods to gracefully reroute connections between client devices and server devices. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of gracefully rerouting a connection between a client device and a server device set in accordance with an embodiment is shown. The method may be performed, for example, by any of the components of the system of FIG. 1, and/or other components not shown therein.

At operation 300, a transmission path between a client device and a server device set may be identified to be modified. The transmission path may be identified by (i) monitoring workloads performed using the transmission path, (ii) obtaining information regarding statuses (e.g., error codes, delayed responses, connection quality, etc.) of a portion of the connections that use the transmission path, (iii) determining whether an aggregator in the transmission path may be overloaded, and/or any other methods.

At operation 302, suspension of a logical connection between the client device and the server device set may be initiated. The suspension of the logical connection may be initiated by (i) sending a communication to the client device, (ii) obtaining information regarding a predetermined state to place the logical connection, invoking a suspension method, and/or any other process. The communication may include a signal to (i) synchronize a state of the logical connection, (ii) flush the logical connection to complete transmission of all in-transit data, (iii) suspend transmission of new data, and/or any other actions to place the logical connection in a predetermined state.

At operation 304, the transmission path may be modified to remove a first aggregator previous in the transmission path and to add a second aggregator to a second server device set that was previously not in the transmission path. The transmission path may be modified by (i) disconnecting an internet protocol routable connection between the client device and the first aggregator in the transmission path, (ii) selecting a second aggregator based at least in part on a load balancing algorithm, (iii) establishing a new internet protocol routable connection between the client device and the second aggregator in the transmission path, and/or any other methods.

At operation 306, the logical connection may be resumed using the modified transmission path. The logical connection may be resumed by (i) sending a communication by the client device signaling data transmission may resume, (ii) transmitting data by the client device using the modified transmission path, and/or any other method.

The method may end following operation 306.

Using the method shown in FIG. 3A, a connection between a client device and a server device set may be gracefully rerouted by modifying a transmission path while a logical connection between the client device and a service provided by the server device set is suspended. Using the modified transmission path, the client device may resume use of the service provided by a second server device set.

Turning to FIG. 3B, a second flow diagram illustrating a method of suspending a logical connection between a client device and a server device in accordance with an embodiment is shown. The method may be performed, for example, by any of the components of the system of FIG. 1, and/or other components not shown therein.

At operation 308, a state of a logical connection between a client device and a server device set may be synchronized. The state of the logical connection may be synchronized by (i) obtaining information regarding a predetermined state of the logical connection, (ii) verifying that the logical connection is at the predetermined state, (iii) storing a copy of data while at the predetermined state, and/or any other methods.

At operation 310, the logical connection may be flushed to complete transmission of all in-transit data over a transmission path supporting the logical connection. The logical connection may be flushed by (i) completing transmission of all in-transit data, (ii) clearing a queue of buffered data, and/or any other methods.

At operation 312, transmission of new data over the transmission path may be suspended. The transmission of new data may be suspended by (i) pausing data transmission by client device 200, (ii) disabling a send function, and/or any other method.

The method may end following operation 312.

Using the method shown in FIG. 3B, a logical connection between a client device and a server device set may be suspended and placed in a predetermined state. While the logical connection is suspended and in the predetermined state, a transmission path supporting the logical connection may be modified.

Figure 4:
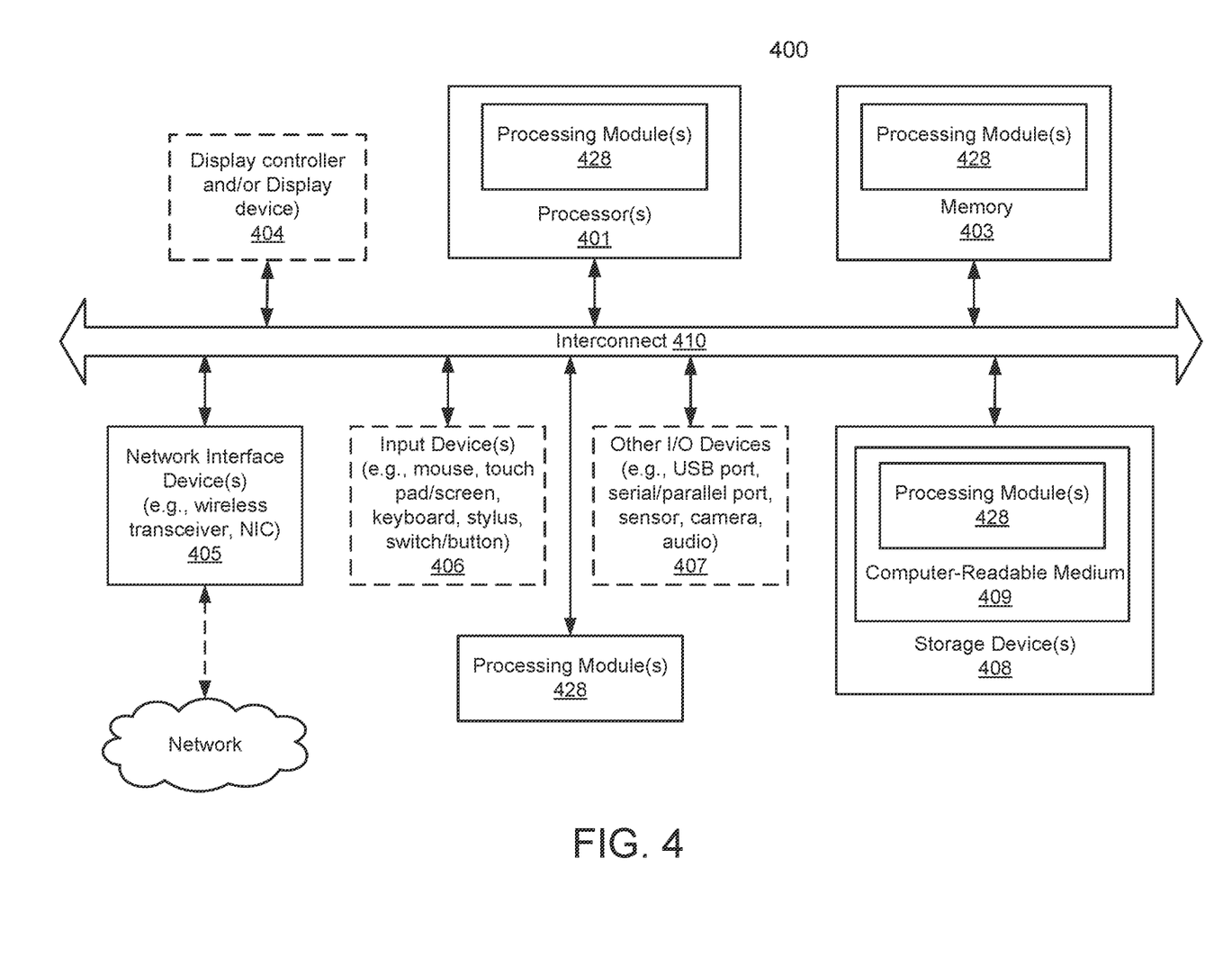
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for rerouting connections between client and server devices, the method comprising:
   identifying, by a load balancing system, that a transmission path between a client device and a first server device set is to be modified, the transmission path supporting a logical connection between a first entity hosted by the client device and a service provided by at least the first server device set;
   based on the identifying:
   initiating suspension of the logical connection until the logical connection is free of in-transit data;
   while the logical connection is free of the in-transit data, modifying the transmission path to:
   remove a first aggregator that was previously in the transmission path, and
   add a second aggregator to a second server device set that was not previously in the transmission path; and
   resuming, using the modified transmission path, the logical connection to enable the client device to resume use of the service.

2. The method of claim 1, wherein the client device and the first server device set are hosted in different network domains, and aggregators facilitate communication between the different network domains by providing data routing services, and the aggregators comprising the first aggregator and the second aggregator.

3. The method of claim 1, wherein identifying that a transmission path is to be modified comprises:
   obtaining information regarding statuses of at least a portion of the connections that run through the first aggregator, the information usable to identify whether the first aggregator is overloaded.

4. The method of claim 1, wherein the transmission path is a physical route that data follows to support communication between the client device and the first server device set.

5. The method of claim 1, wherein the first server device set is one of a plurality of server device sets, each of the plurality of server device sets being configured to provide the service to the client device while the client device is in communication with a corresponding one of the plurality of server device sets.

6. The method of claim 5, wherein modifying the transmission path comprises:
   disconnecting an internet protocol routable connection between the client device and the first aggregator in the transmission path;
   selecting a second aggregator based at least in part on a load balancing algorithm; and
   establishing a new internet protocol routable connection between the client device and the second aggregator in the transmission path.

7. The method of claim 6, wherein disconnecting the internet protocol routable connection from the first aggregator and establishing the new internet protocol routable connection with the second aggregator is non-disruptive to a logical connection between the client device and any of the plurality of server device sets.

8. The method of claim 1, wherein initiating suspension of the logical connection comprises:
   sending a communication to the client device, the communication signaling the client device to:
   synchronize a state of the logical connection between the client device and the first server device set;
   flush the logical connection to complete transmission of all in-transit data over the transmission path; and suspend transmission of new data over the transmission path.

9. The method of claim 8, wherein resuming the logical connection comprises:
sending, by the second aggregator, a communication to the client device, the communication signaling that the logical connection is to be resumed; and
initiating performance of data transmission between the client device and the second server device set along the modified transmission path.

10. The method of claim 9, wherein the performance of data transmission between the client device and the second server device set along the modified transmission path is based, at least in part, on the synchronized state of the logical connection between the client device and the first server device set.

11. A non-transitory machine-readable medium having instructions stored therein, which when executed by a processor, cause the processor to perform operations for rerouting connections between client and server devices, the operations comprising:
identifying, by a load balancing system, that a transmission path between a client device and a first server device set is to be modified, the transmission path supporting a logical connection between a first entity hosted by the client device and a service provided by at least the first server device set;
based on the identifying:
initiating suspension of the logical connection until the logical connection is free of in-transit data;
while the logical connection is free of the in-transit data, modifying the transmission path to:
remove a first aggregator that was previously in the transmission path, and
add a second aggregator to a second server device set and that was not previously in the transmission path; and
resuming, using the modified transmission path, the logical connection to enable the client device to resume use of the service.

12. The non-transitory machine-readable medium of claim 11, wherein the client device and the first server device set are hosted in different network domains, and aggregators facilitate communication between the different network domains by providing data routing services, and the aggregators comprising the first aggregator and the second aggregator.

13. The non-transitory machine-readable medium of claim 11, wherein identifying that a transmission path is to be modified comprises:
obtaining information regarding statuses of at least a portion of the connections that run through the first aggregator, the information usable to identify whether the first aggregator is overloaded.

14. The non-transitory machine-readable medium of claim 11, wherein the transmission path is a physical route that data follows to support communication between the client device and the first server device set.

15. The non-transitory machine-readable medium of claim 11, wherein the first server device set is one of a plurality of server device sets, each of the plurality of server device sets being configured to provide the service to the client device while the client device is in communication with a corresponding one of the plurality of server device sets.

16. A data processing system, comprising:
a processor; and
a memory coupled to the processor to store instructions, which when executed by the processor, cause the processor to perform operations for rerouting connections between client and server devices, the operations comprising:
identifying, by a load balancing system, that a transmission path between a client device and a first server device set is to be modified, the transmission path supporting a logical connection between a first entity hosted by the client device and a service provided by at least the first server device set;
based on the identifying:
initiating suspension of the logical connection until the logical connection is free of in-transit data;
while the logical connection is free of the in-transit data, modifying the transmission path to:
remove a first aggregator that was previously in the transmission path, and
add a second aggregator to a second server device set and that was not previously in the transmission path; and
resuming, using the modified transmission path, the logical connection to enable the client device to resume use of the service.

17. The data processing system of claim 16, wherein the client device and the first server device set are hosted in different network domains, and aggregators facilitate communication between the different network domains by providing data routing services, and the aggregators comprising the first aggregator and the second aggregator.

18. The data processing system of claim 16, wherein identifying that a transmission path is to be modified comprises:
obtaining information regarding statuses of at least a portion of the connections that run through the first aggregator, the information usable to identify whether the first aggregator is overloaded.

19. The data processing system of claim 16, wherein the transmission path is a physical route that data follows to support communication between the client device and the first server device set.

20. The data processing system of claim 16, wherein the server device set is one of a plurality of server device sets, each of the plurality of server device sets being configured to provide the service to the client device while the client device is in communication with a corresponding one of the plurality of server device sets.

* * * * *